US007493046B2

(12) United States Patent
Kyoto

(10) Patent No.: US 7,493,046 B2
(45) Date of Patent: Feb. 17, 2009

(54) REMOTE CONTROL TRANSMITTER

(75) Inventor: Tomoaki Kyoto, Daito (JP)

(73) Assignee: Funai Eletric Co., Ltd., Daito-shi (JP)

( * ) Notice: Subject to any disclaimer, the term of this patent is extended or adjusted under 35 U.S.C. 154(b) by 507 days.

(21) Appl. No.: 10/993,126

(22) Filed: Nov. 22, 2004

(65) Prior Publication Data

US 2005/0128119 A1 Jun. 16, 2005

(30) Foreign Application Priority Data

Nov. 20, 2003 (JP) ............................ 2003-390190

(51) Int. Cl.
*H04B 10/00* (2006.01)

(52) U.S. Cl. ....................... 398/106; 398/107; 398/108; 398/109; 398/111; 398/112; 398/114; 398/115; 398/116; 398/118; 398/119; 398/164; 398/182; 398/192; 398/194; 398/135; 340/825.69; 340/825.72; 340/825.22; 340/825.25; 341/176; 348/734; 345/169; 345/158; 345/173

(58) Field of Classification Search ................. 398/106, 398/135, 11.5, 118, 119, 116, 117, 136, 182, 398/183, 192, 194, 197, 107, 108, 109, 110, 398/111, 113, 114, 115, 187, 38, 164, 112, 398/193; 340/825.69, 825.72, 825.22, 825.25; 345/158, 169, 173; 348/734; 341/176, 174, 341/177, 173
See application file for complete search history.

(56) References Cited

U.S. PATENT DOCUMENTS 5,850,304 A * 12/1998 Elmers et al. ............... 398/107
5,917,630 A * 6/1999 Kadowaki et al. ........... 398/130
6,115,160 A * 9/2000 Anzai et al. .................. 398/129
6,307,499 B1 * 10/2001 Williamson et al. ......... 341/176
6,377,376 B1 * 4/2002 Gfeller et al. ............... 398/135
6,424,442 B1 * 7/2002 Gfeller et al. ............... 398/135
7,132,973 B2 * 11/2006 Jindal ......................... 341/176

FOREIGN PATENT DOCUMENTS

JP 06-002932 A 1/1994
JP 08-008068 A 1/1996
JP 08-168083 6/1996
JP 08-149078 A 8/1996
JP 2000-353813 12/2000

* cited by examiner

*Primary Examiner*—Hanh Phan
(74) *Attorney, Agent, or Firm*—Crowell & Moring LLP

(57) ABSTRACT

Light emitting diodes are placed side by side at a front end of the remote control transmitter in a manner that their maximum radiation directions, i.e. radiation directions each giving a maximum radiation intensity, are each inclined at an angle within a range no larger than 5 degrees outwardly of the remote control transmitter 1 and symmetrically with respect to a bisector of a line segment which connects center points of the light emitting diodes. The inclination, within a range no larger than 5 degrees, of each of the light emitting diodes used as light sources for remote control does not cause significant reduction in the radiation intensity. Accordingly, it is possible to widen the transmittable angle within a range no larger than 10 degrees without significantly reducing the radiation intensity at a central portion of the radiation range.

8 Claims, 5 Drawing Sheets

REMOTE CONTROL TRANSMITTER

BACKGROUND OF THE INVENTION

1. Field of the Invention

The present invention relates to a remote control transmitter to remotely control electric devices, and more particularly to a remote control transmitter suited to be used for an image projector.

2. Description of the Related Art

It is known to use a remote control transmitter to remotely control electric devices. A light emitting diode is used as a light source for remote control in the remote control transmitter. In some cases, the remote control transmitter is used to control an electric device such as image projector that is placed in a wide space and remotely controlled. The remote control transmitter for such use is required to have a long transmission distance and a wide transmittable angle (wide directivity). For this reason, as shown in FIG. 5A and FIG. 5B, a conventional remote control transmitter 101 has a pair of light emitting diodes 111*a* and 111*b*. The pair of light emitting diodes 111*a* and 111*b* have substantially the same electrical and optical characteristics, and are mounted in holders 112*a* and 112*b* and placed side by side at A front end 110 of the remote control transmitter 101. The remote control transmitter 101 transmits remote control signals to electric devices according to operation of an operating unit 120 by a user.

The light emitting diodes 111*a* and 111*b* have transmission ranges La and Lb. In order to extend the transmission distance of the remote control signals, the light emitting diodes 111*a* and 111*b* are so placed at the front end 110 that respective maximum radiation directions C' each giving a maximum radiation intensity are parallel to each other. By providing the two light emitting diodes 111*a* and 111*b* in such manner, the remote control transmitter 101 is enhanced in its capability to transmit the remote control signals and improved in its operability.

However, according to such conventional remote control transmitter 101, it has not been possible to significantly widen its transmittable angle although its capability of long distance transmission can be significantly improved by using the two light emitting diodes 111*a* and 111*b*.

Meanwhile, an attempt has been made for a known remote control transmitter to have both the capability of long distance transmission and wide directivity by using a light emitting diode with wide directivity in combination with a light emitting diode with narrow directivity (refer to e.g. Japanese Laid-open Patent Publication Hei 8-168083). The remote control transmitter disclosed therein is to be used for door locking apparatus for cars. According to such known remote control transmitter, it is possible to obtain wide directivity in short distance areas by using the combination of wide directivity and narrow directivity light emitting diodes. However, it is not possible to obtain wide directivity in long distance areas. In other words, such remote control transmitter may be suited to remotely control the door locking apparatus for cars, but cannot contribute to much improvement of operability of electric devices such as an image projector to be usually placed distantly from a user in a wide space.

Besides, there is known a light emitting device, in which a lens having a shape such as cylinder is provided on the front face of the light emitting element, in order to make it possible to widen the emission angle (refer to e.g. Japanese Laid-open Patent Publication 2000-353813). However, it cannot extend the transmission distance.

SUMMARY OF THE INVENTION

An object of the present invention is to provide a remote control transmitter which comprises plural light emitting diodes each as a light source for remote control, and which is widened in the transmittable angle and improved in the operability while maintaining its capability of long distance transmission.

This object is achieved according to the present invention by a remote control transmitter comprising plural light emitting diodes placed therein that include at least one pair of light emitting diodes and have, as light sources for remote control, substantially the same electrical and optical characteristics, wherein the pair of light emitting diodes are placed in a manner that maximum radiation directions of the pair of light emitting diodes each giving a maximum radiation intensity are each inclined at a given angle symmetrically with respect to a bisector of a line segment which connects center points of the pair of light emitting diodes.

This remote control transmitter is advantageous in that its transmittable angle can be widened with its capability of long distance transmission being maintained or without significantly reducing the radiation intensity at a central portion of the radiation range, thereby making it possible to improve the operability of the remote control transmitter.

Preferably, the given angle for inclination is such that one of radiation directions of each of the pair of light emitting diodes giving a relative radiation intensity of 90% relative to the maximum radiation intensity is parallel to the bisector. Thereby, an appropriate angle for mounting the light emitting diodes to the remote control transmitter can be obtained while the radiation intensity or radiation distance of the remote control transmitter is secured.

Further preferably, the light emitting diodes emit infrared light, wherein the pair of light emitting diodes are placed side by side at a front end of the remote control transmitter, and wherein the maximum radiation directions of the pair of light emitting diodes are each inclined within a range no larger than 5 degrees outwardly of the remote control transmitter. The inclination of an infrared light emitting diode within a range no larger than 5 degrees does not cause a significant reduction in the radiation intensity. Accordingly, by placing the infrared light emitting diodes so as to be inclined symmetrically left and right and outwardly of the remote control transmitter each at an angle of 5 degrees, it becomes possible to widen the transmittable angle by 10 degrees without significantly reducing the radiation intensity in a central direction of the sum radiation range obtained by combining the radiation ranges of the pair of infrared light emitting diodes. Thus, the transmittable angle of the remote control transmitter can be widened while the capability of long distance transmission due to the use of the two light emitting diodes is maintained, thereby making it possible to improve the operability of the remote control transmitter.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1B:
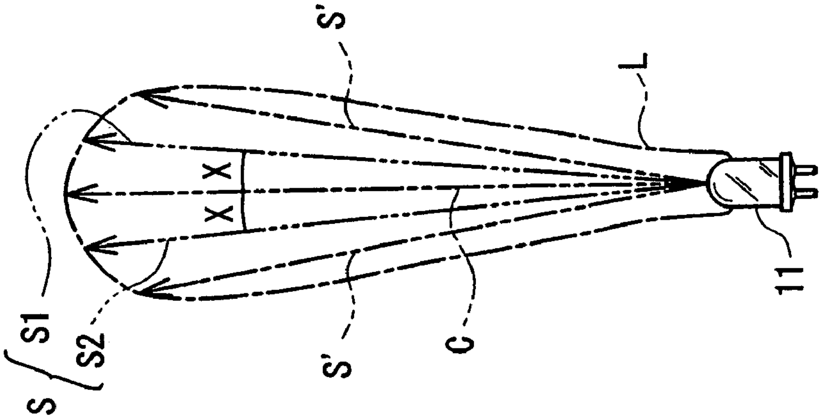
FIG. 1B is a schematic view showing transmittable range of the light emitting diode.

A remote control transmitter 1 according to a first embodiment of the present invention will be described hereinafter with reference to FIG. 1A, FIG. 1B and FIG. 2. This remote control transmitter 1 is of a type used to control electric devices such as an image projector to be used in a wide space. Two light emitting diodes 111 (11*a* and 11*b*) having a transmission range L as shown in FIG. 1B are used as light sources for remote control. Any light emitting diodes can be used therefor, but those emitting infrared light are used here.

Figure 1A:
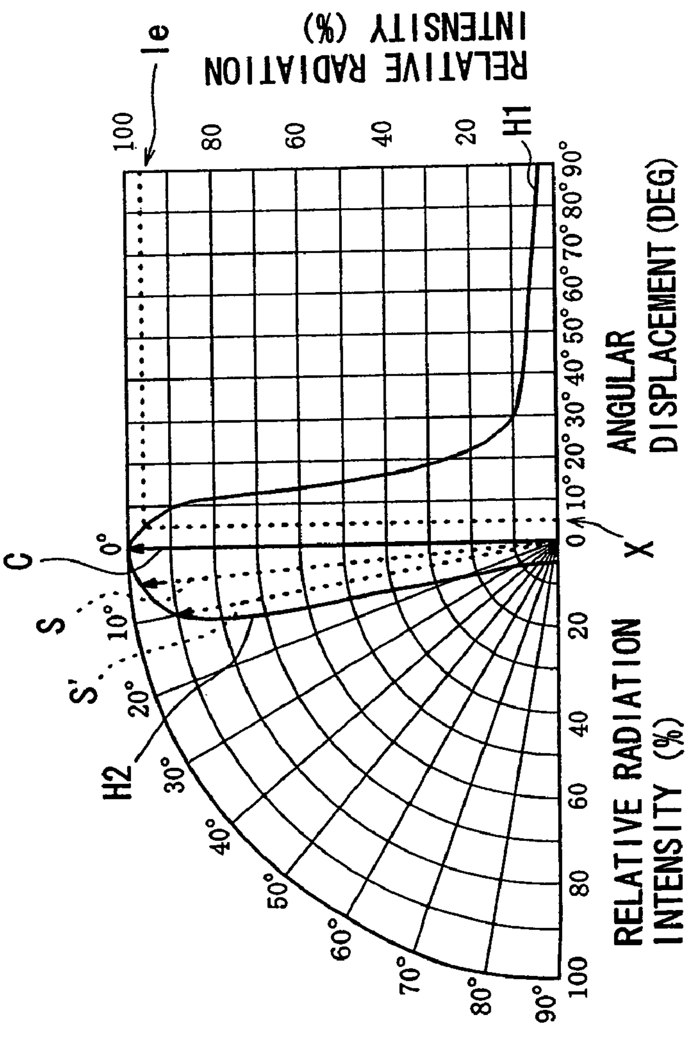
FIG. 1A is a graph showing the directivity characteristics of a light emitting diode used for a remote control transmitter according to a first embodiment of the present invention.
Figure 2:
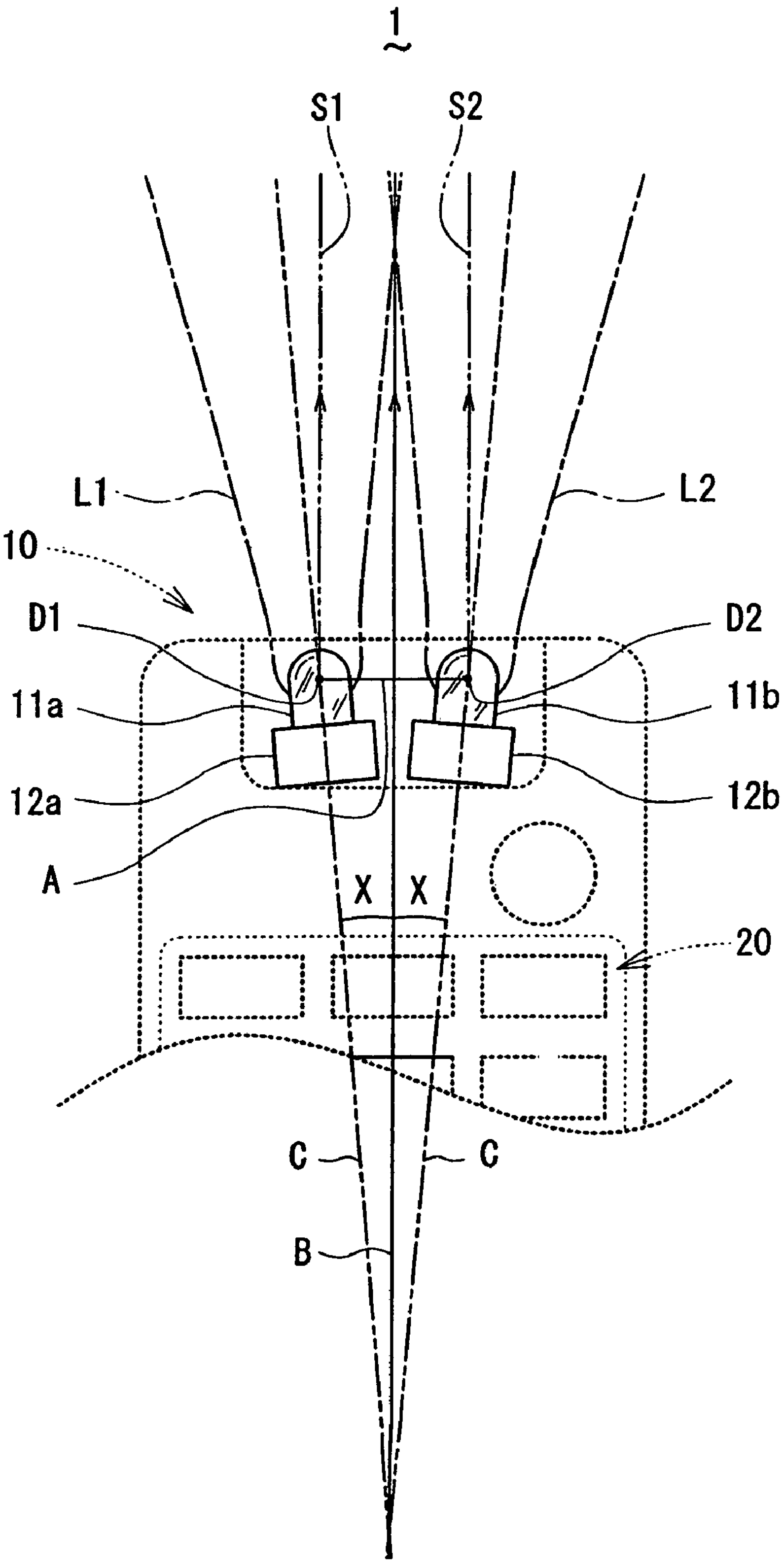
FIG. 2 is a schematic and perspective top plan view showing a part of the remote control transmitter including and near its front end.

Referring to FIG. 1A and FIG. 1B, the directivity of each light emitting diode 11 will be first described. In the right half of the graph of FIG. 1A, the horizontal axis indicates angular displacement, while the vertical axis indicates relative radiation intensity, in which the directivity characteristics of the light emitting diode 11 is shown by curve H1. On the other hand, the left half of the graph of FIG. 1A is a representation equivalent to the right half, with the coordinate axes having been changed, in which the relative radiation intensity is indicated by the horizontal axis, while the angular displacement is shown radially. In the left half of the graph, the directivity characteristics of the light emitting diode is shown by curve H2.

The light emitting diode 11 has a peak value of radiation intensity (maximum radiation intensity) in radiation direction C, namely at an angle of 0 degree with respect to the radiation direction C, and has a relative radiation intensity Ie relative to this peak value in direction S which has an angle X with respect to the radiation direction C (namely angular displacement X from the peak or maximum radiation direction C). Accordingly, when radiation range L of the light emitting diode 11 is seen two-dimensionally as shown in FIG. 1B, there are two directions S1 and S2, each as the direction S giving the relative radiation intensity Ie, that are positioned on both sides of the radiation direction C which serves as a symmetrical axis. FIG. 1B further shows directions S' which will be described later.

Next, referring to FIG. 2, the mounting angle for each light emitting diode 11 will be described. In FIG. 2, a pair of light emitting diodes 11 used as light sources for remote control are referred to as light emitting diodes 11*a* and 11*b*, while radiation ranges L of the light emitting diodes 11*a* and 11*b* are referred to as radiation ranges L1 and L2. The light emitting diodes 11*a* and 11*b* are mounted in holders 12*a* and 12*b* and placed side by side at a front end 10 of the remote control transmitter 1. The light emitting diodes 11*a* and 11*b* transmit, to electric devices, infrared pulses for controlling the electric devices according to operation of an operating unit 20 by a user.

The light emitting diodes 11*a* and 11*b* are placed side by side in a manner that their radiation directions C are each inclined at an angle of X outwardly of the remote control transmitter 1 and symmetrically with respect to a bisector B of a line segment A which connects center points D1 and D2 of the light emitting diodes 11*a* and 11*b*. Thus, the light emitting diode 11*a* is so placed that its direction S1 inclined at an angle of X with respect to its radiation direction C is parallel to the bisector B, while the light emitting diode 11*b* is so placed that its direction S2 inclined at an angle of X with respect to its radiation direction C is parallel to the bisector B.

Assuming here that the inclination angle X is 5 degrees, the relative radiation intensity in the direction S (S1 and S2 in FIG. 2) relative to the radiation intensity in the radiation direction C becomes about 97% as shown in FIG. 1A. As evident from this, in the case of the light emitting diode used as the light source for remote control, the inclination of the light emitting diode within a range no larger than 5 degrees does not usually cause a significant reduction in the radiation intensity (particularly in the case of light emitting diodes to emit infrared light). Accordingly, by placing the light emitting diodes 11*a* and 11*b* so as to be inclined symmetrically and outwardly of the remote control transmitter 1 each at an angle of 5 degrees, it becomes possible to widen the transmittable angle by 10 degrees without significantly reducing the radiation intensity in a central direction of the sum radiation range obtained by combining the radiation ranges L1 and L2. Thus, the transmittable angle of the remote control transmitter 1 can be widened while the capability of long distance transmission due to the use of the two light emitting diodes 11*a* and 11*b* is maintained, thereby making it possible to improve the operability of the remote control transmitter 1.

In the above description, the mounting angle X is directly set at 5 degrees since the radiation intensity of a light emitting diode to be used for a remote control transmitter is usually not significantly reduced within the range of the mounting angle X no larger than 5 degrees. However, it is also possible to obtain the mounting angle X from the relationship between the angular displacement and the relative radiation intensity of the light emitting diode 11 as shown in FIG. 1A. More specifically, selecting 90% as a limit relative radiation intensity, it is possible to limit the mounting angle X in a manner that direction S', which gives relative radiation intensity of 90%, or any arbitrary direction having less angular displacement than the direction S' becomes parallel to the bisector B. Thereby, it becomes possible to obtain an appropriate mounting angle to widen the transmission distance and the transmittable angle range of the remote control transmitter 1 according to the directivity characteristics of the light emitting diodes 11*a* and 11*b* used as light sources for remote control.

Figure 3:
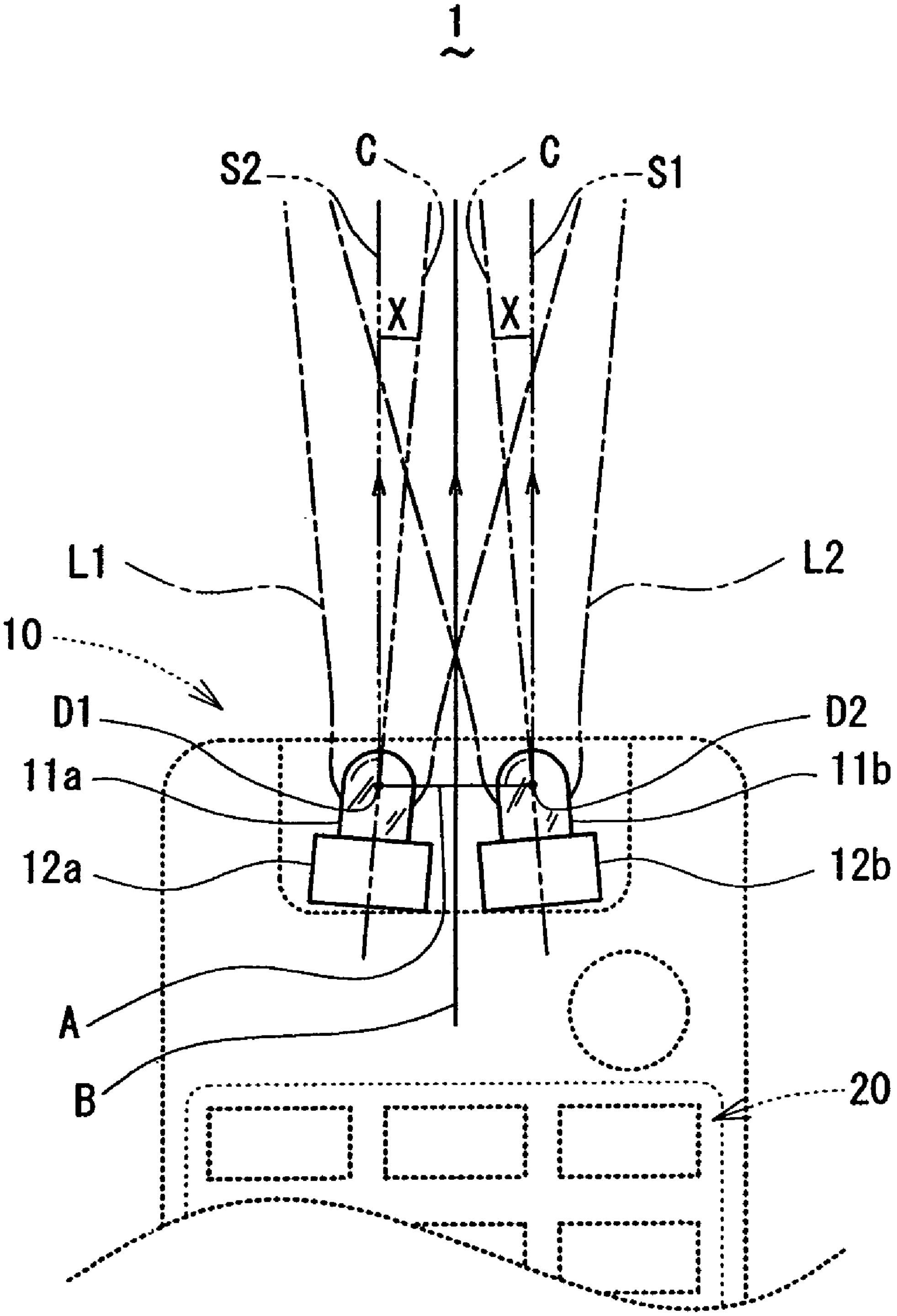
FIG. 3 is a schematic and perspective top plan view showing a part of a remote control transmitter, including and near its front end, according to a second embodiment of the present invention.

Hereinafter, a second embodiment of the present invention will be described with reference to FIG. 3. This second embodiment is basically the same as the first embodiment, but is different from the first embodiment in that diodes 11*a* and 11*b* are placed to be inclined inwardly of remote control transmitter 1. More specifically, the light emitting diodes 11*a* and 11*b* are placed side by side in a manner that their radiation directions C are each inclined at an angle of 5 degrees inwardly of the remote control transmitter 1 and symmetrically with respect to a bisector B of a line segment A which connects center points D1 and D2 of the light emitting diodes 11*a* and 11*b*. According to such structure as well, it becomes possible to widen the transmittable angle by 10 degrees without significantly reducing the radiation intensity at a central portion of the radiation range. Thus, the transmittable angle of the remote control transmitter 1 can be widened while the capability of long distance transmission is maintained, thereby making it possible to improve the operability of the remote control transmitter 1.

It is to be noted that the present invention is not limited to the structures or configurations of the above embodiments, and various modifications are possible. For example, although the light emitting diodes 11*a* and 11*b* are placed side by side laterally at the front end 10 of the remote control transmitter 1, it is possible to place the light emitting diodes 11*a* and 11*b* side by side longitudinally at the front end 10. Furthermore, the number of light emitting diodes 11 is not limited to two, and can be more than two. Besides, the electric devices to be controlled using the remote control transmitter 1 are not limited to the image projectors, but can be e.g. those that require the capability of long distance transmission and wide transmission angle.

Figure 4A:
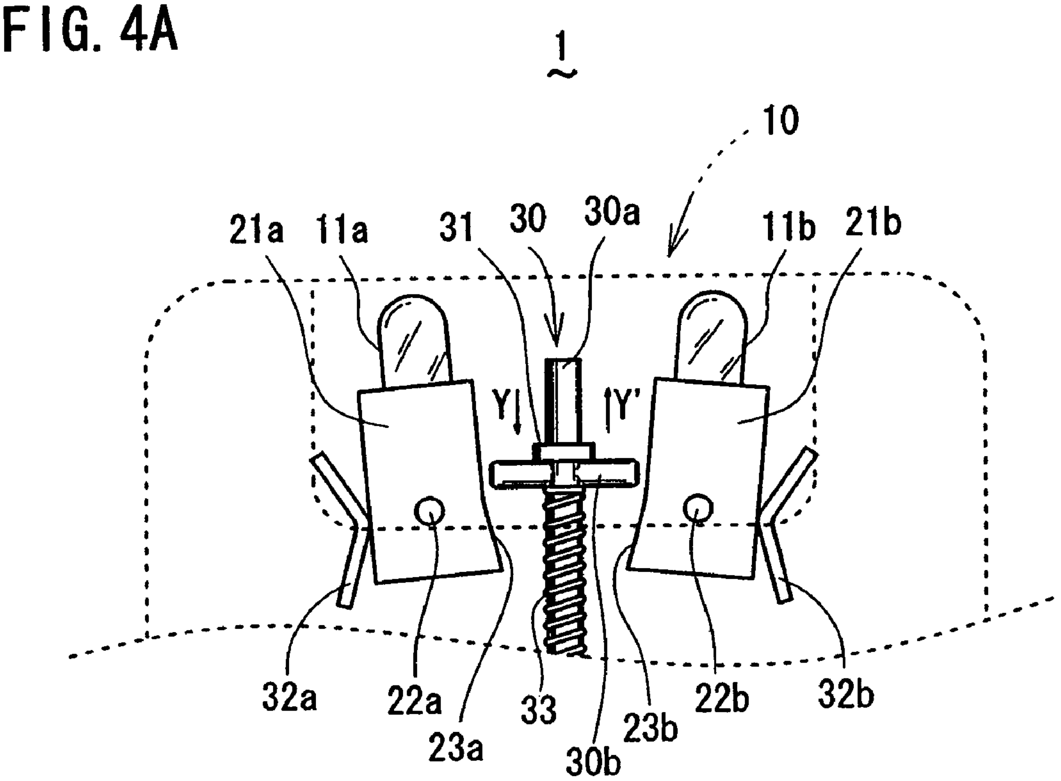
FIG. 4A and FIG. 4B are schematic and perspective top plan views showing a part of a remote control transmitter, including and near its front end, according to a modified example of each of the embodiments.
Figure 4B:
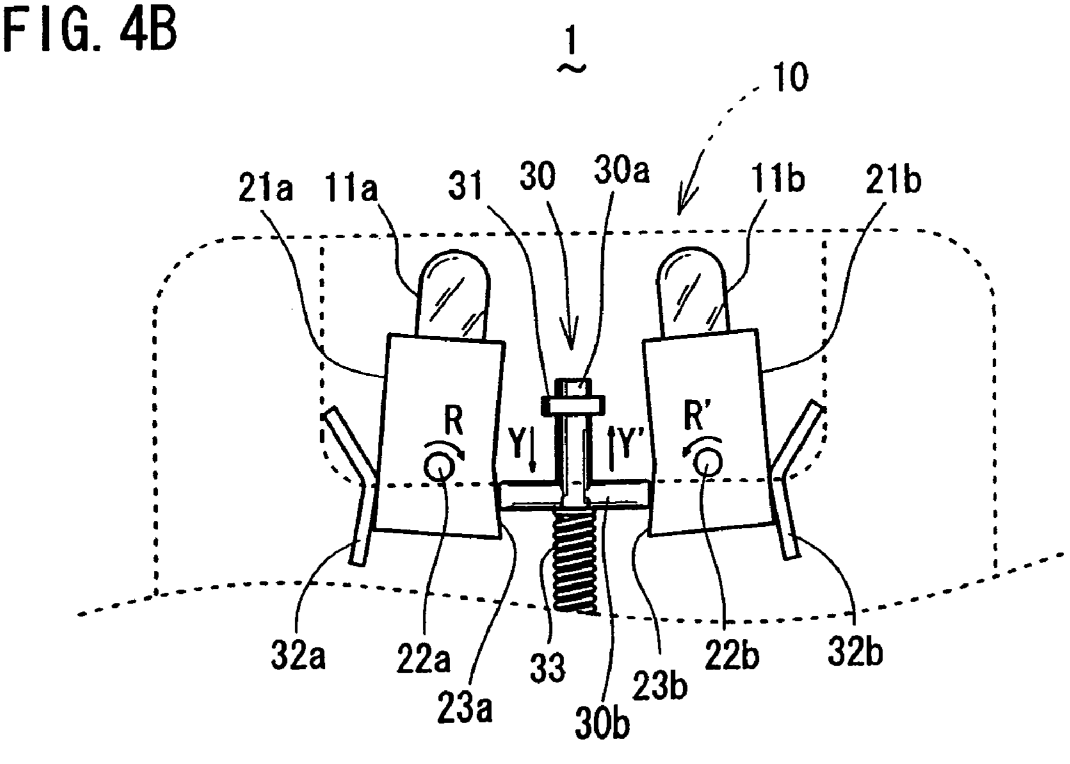
Figure 5A:
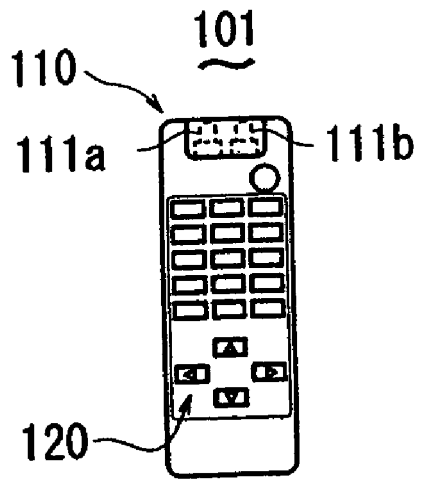
FIG. 5A PRIOR ART
FIG. 5A is a schematic top plan view of a remote control transmitter according to prior art.
Figure 5B:
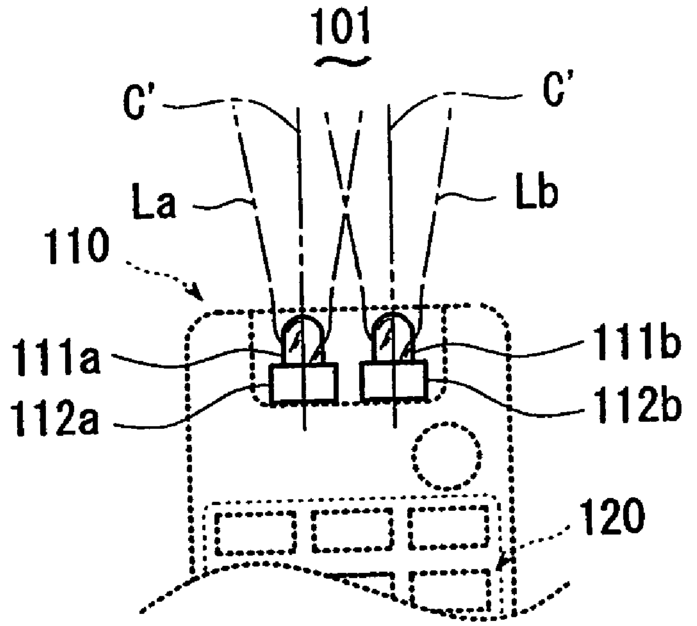
FIG. 5B PRIOR ART
FIG. 5B is a schematic and perspective top plan view showing a part of the remote control transmitter, including and near its front end, according to the prior art.

Furthermore, as shown in FIG. 4A and FIG. 4B, it is possible to mount the light emitting diodes 11*a* and 11*b* together with holders 21*a* and 21*b* at a front end 10 of a remote control transmitter 1 in a manner that their mounting angles can be adjusted. Referring to FIG. 4A and FIG. 4B, the light emitting diodes 11*a* and 11*b* together with the holders 21*a* and 21*b* are fixed at the front end 10 so as to be pivotable about pivot shafts 22*a* and 22*b*. An angle adjustment unit 30 is mounted at the front end 10 in a manner that its shaft 30*a* can move in both directions Y and Y' and is latched by its latching member 31.

As shown in FIG. 4A, in a state where the shaft 30*a* of the angle adjustment unit 30 is not pulled in the direction Y, the holders 21*a* and 21*b* do not contact with the angle adjustment unit 30, so that the light emitting diodes 11*a* and 11*b* are inclined outwardly of the remote control transmitter 1 due to the biasing forces of plate springs 32*a* and 32*b*. On the other hand, when the shaft 31*a* of the adjustment unit 30 is pulled in the direction Y by user operation against the biasing force of a spring 33 as shown in FIG. 4B, then projections 30*b* of the angle adjustment unit 30 are brought to contact with side portions 23*a* and 23*b* of the holders 21*a* and 21*b*, respectively. When the shaft 30*a* of the angle adjustment unit 30 is further pulled in the direction Y while the projections 30*b* are in contact with the side portions 23*a* and 23*b*, then the holders 21*a* and 21*b* pivot in directions R and R' against the biasing forces of the plate springs 32*a* and 32*b*, respectively, so that the light emitting diodes 11*a* and 11*b* become inclined inwardly of the remote control transmitter 1. This arrangement makes it possible to appropriately adjust the transmittable distance and angle of the remote control transmitter 1.

This application is based on Japanese patent application 2003-390190 filed in Japan dated Nov. 20, 2003, the contents of which are hereby incorporated by reference.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A remote control transmitter, comprising plural light emitting diodes placed therein that include at least one pair of light emitting diodes and have, as light sources for remote control, substantially the same electrical and optical characteristics, wherein the pair of light emitting diodes are placed in a manner that maximum radiation directions of the pair of light emitting diodes each giving a maximum radiation intensity are each inclined at a given angle symmetrically with respect to a bisector of a line segment which connects center points of the pair of light emitting diodes, wherein the given angle is such that one of radiation directions of each of the pair of light emitting diodes giving a relative radiation intensity of 90% relative to the maximum radiation intensity is parallel to the bisector, and wherein the remote control transmitter further comprises an angle adjustment unit configured to rotate the pair of light emitting diodes in order to adjust an inclination of the pair of light emitting diodes.

2. The remote control transmitter according to claim 1, wherein the angle adjustment unit comprises a shaft which has plural projections and is movable along a direction parallel to the bisector, plural holders each of which holds each of the pair of light emitting diodes, and each of which is pivotable, and plural elate springs each of which biases each of the holders outwardly of the remote control transmitter, wherein, when the shaft is pulled along the direction parallel to the bisector by user operation, each of the projections is brought to contact with each of the holders, and wherein, when the shaft is further pulled alone the direction parallel to the bisector, each of the holders pivots against biasing force of each of the plate springs so that the pair of light emitting diodes becomes inclined inwardly of the remote control transmitter.

3. The remote control transmitter according to claim 2, further comprising a latching member configured to latch the angle adjustment member.

4. The remote control transmitter according to claim 2, further comprising a plate spring configured to supply a biasing force to the pair of light emitting diodes.

5. A remote control transmitter, comprising plural light emitting diodes placed therein that include at least one pair of light emitting diodes and have, as light sources for remote control, substantially the same electrical and optical characteristics, wherein the pair of light emitting diodes are placed in a manner that maximum radiation directions of the pair of light emitting diodes each giving a maximum radiation intensity are each inclined at a given angle symmetrically with respect to a bisector of a line segment which connects center points of the pair of light emitting diodes, wherein the light emitting diodes emit infrared light, wherein the pair of light emitting diodes are placed side by side at a front end of the remote control transmitter, wherein the maximum radiation directions of the pair of light emitting diodes are each inclined within a range no larger than 5 degrees outwardly of the remote control transmitter, and wherein the remote control transmitter further comprises an angle adjustment unit configured to rotate the pair of light emitting diodes in order to adjust an inclination of the pair of light emitting diodes.

6. The remote control transmitter according to claim 5, further comprising an angle adjustment unit configured to adjust an inclination of the pair of light emitting diodes.

7. The remote control transmitter according to claim 6, further comprising a latching member configured to latch the angle adjustment member.

8. The remote control transmitter according to claim 6, further comprising a plate spring configured to supply a biasing force to the pair of light emitting diodes.

* * * * *